United States Patent [19]

Cane et al.

[11] Patent Number: 5,162,085
[45] Date of Patent: Nov. 10, 1992

[54] PROCESS FOR THE PRODUCTION OF AN OVERBASED PHENATE CONCENTRATE

[75] Inventors: Charles Cane, North Humberside; David A. Duncan, West Yorkshire; Sean P. O'Connor, North Humberside, all of England

[73] Assignee: BP Chemicals (Additives) Limited, London, England

[21] Appl. No.: 482,530

[22] Filed: Feb. 21, 1990

[30] Foreign Application Priority Data

Feb. 25, 1989 [GB] United Kingdom ............... 8904344
Feb. 25, 1989 [GB] United Kingdom ............... 8904345

[51] Int. Cl.$^5$ .......................................... C10M 159/22
[52] U.S. Cl. ....................................... 252/18; 252/39; 252/42.7
[58] Field of Search .............. 252/38, 39, 40.7, 36, 252/18, 39, 42.7

[56] References Cited

U.S. PATENT DOCUMENTS

| | | | |
|---|---|---|---|
| 3,372,116 | 3/1968 | Meinhardt | 252/39 |
| 3,410,798 | 11/1968 | Cohen | 252/37.2 |
| 4,049,560 | 9/1977 | Dominey | 252/33.3 |
| 4,302,342 | 11/1981 | Demoures | 252/39 |

FOREIGN PATENT DOCUMENTS

| | | |
|---|---|---|
| 0095322 | 11/1983 | European Pat. Off. |
| 0271262 | 11/1987 | European Pat. Off. |
| 0273588 | 7/1988 | European Pat. Off. |
| 0347103 | 12/1989 | European Pat. Off. |
| 0347104 | 12/1989 | European Pat. Off. |
| 0354647 | 2/1990 | European Pat. Off. |
| 2244245 | 9/1972 | Fed. Rep. of Germany ........ 252/39 |

*Primary Examiner*—Jerry Johnson
*Attorney, Agent, or Firm*—Brooks Haidt Haffner & Delahunty

[57] ABSTRACT

A process for the preparation of lubricating oil additive concentrate having a TBN greater than 300 comprises reacting at elevated temperature component (A) at least one compound which is A(i) an alkaline earth metal hydrocarbyl-substituted phenate, A(ii) a hydrocarbyl-substituted phenol, A(iii) an alkaline earth metal hydrocarbyl-substituted phenate and a source of sulphur, A(iv) a hydrocarbyl-substituted phenol and a source of sulphur, A(v) an alkaline earth metal sulphurized hydrocarbyl-substituted phenate or A(vi) a sulphurized hydrocarbyl-substituted phenol.

component (B) an alkaline earth metal base
component (C) a defined oxygenated compound
component (D) a lubricating oil,
component (E) carbon dioxide
component (F) sufficient to provide from 2 to 40% by weight based on the weight of the concentrate, of a defined carboxylic acid or derivative thereof, and
component (G) an ammonium alkanoate or a mono-, di-, tri- or tetra-alkyl ammonium formate or alkanoate, the weight ratios of components (A) to (G) being such as to produce a concentrate having a TBN greater than 300.

9 Claims, No Drawings

PROCESS FOR THE PRODUCTION OF AN OVERBASED PHENATE CONCENTRATE

The present invention relates to a process for preparing alkaline earth metal hydrocarbyl phenates and their sulphurised derivatives. The phenates have both a high total base number (TBN) and an acceptable viscosity. They are useful as lubricating oil additives.

One class of compounds generally employed to neutralise the acidic materials within the lubricating oil are the metal alkyl phenates and sulphurised metal alkyl phenates, wherein the metal is an alkaline earth metal such as calcium, magnesium or barium. Both "normal" and "overbased" alkaline earth metal alkyl phenates have been employed. The term "overbased" is used to describe those alkaline earth metal alkyl phenates in which the ratio of the number of equivalents of the alkaline earth metal moiety to the number of equivalents of the phenol moiety is greater than 1:1, and is usually greater than 1.2:1 and may be as high as 4.5:1 or greater. In contrast, the equivalent ratio of alkaline earth metal moiety to phenol moiety in "normal" alkaline earth metal alkyl phenates is 1:1. For this reason "overbased" alkaline earth metal alkyl phenates have a greater capability for neutralising acidic matter than do the corresponding "normal" alkaline earth metal alkyl phenates.

It is clearly a desirable objective to produce an additive concentrate comprising alkaline earth metal hydrocarbyl-substituted phenates or sulphurised derivatives thereof having a high TBN, that is a TBN greater than 300, and preferably greater than 350. It had not been previously possible to achieve products of such high TBN because the use of larger concentrations of alkaline earth metal base leads to highly viscous products. Attempts to reduce the viscosity by subsequent carbonation using excess carbon dioxide, rendered the products oil-insoluble. However, European Patent Application 271262, discloses products having a TBN in excess of 300, and in some cases greater than 350, whilst retaining an acceptable viscosity, that is a viscosity at 100° C. of less than 1,000 cSt and avoiding insolubility; this is achieved by incorporating into the reaction mixture a defined amount of certain carboxylic acids having at least 10 carbon atoms or derivatives thereof.

The aforesaid European Application provides an additive concentrate suitable for incorporation into a finished lubricating oil composition, the additive concentrate comprising:
(a) a lubricating oil,
(b) a lubricating oil-soluble sulphurised or non-sulphurised alkaline earth metal hydrocarbyl phenate modified by incorporation of 2 to 40% by weight based on the weight of the composition of either (i) at least one carboxylic acid of formula (I)

wherein $R^1$ is a $C_{10}$ to $C_{24}$ alkyl or alkenyl group and $R^2$ is either hydrogen, a $C_1$ to $C_4$ alkyl group or a —$CH_2$—COOH group, or an anhydride, acid chloride or ester thereof, or (ii) a di- or poly-carboxylic acid containing from 36 to 100 carbon atoms, or an anhydride, acid chloride or ester thereof, The additive concentrate can be prepared by reacting at elevated temperature (1) a hydrocarbyl phenol and optionally sulphur, (2) an alkaline earth metal base, (3) a solvent such as a polyhydric alcohol (4) a lubricating oil, (5) carbon dioxide, and (6) sufficient to provide 2 to 40% by weight based on the weight of the concentrate of either (i) a carboxylic acid having the formula (I) or an acid anhydride, acid chloride or ester thereof or (ii) a di- or polycarboxylic acid containing from 36 to 100 carbon atoms or an acid anhydride, acid chloride or ester thereof.

European Application 273588 also discloses products having a TBN in excess of 300. The products are prepared by a similar process to that disclosed in EP 271262, but instead of using alkyl phenols as starting materials, the process is used to upgrade overbased alkaline earth metal alkyl phenates.

The process disclosed in EP 271262 and EP 273588 can be carried out in the presence of a further component which is a catalyst for the reaction. As catalyst there may be used an inorganic halide which is suitably hydrogen halide, an ammonium halide or a metal halide. Suitably the metal moiety of the metal halide is zinc, aluminium or an alkaline earth metal, preferably calcium. Of the halides, the chloride is preferred. Suitable catalysts include hydrogen chloride, calcium chloride, ammonium chloride, aluminium chloride and zinc chloride; calcium chloride is preferred.

Although the use of the above catalysts in the process gives, in the concentrate, a TBN greater than 300, the process has the disadvantage of using chlorine-containing compounds with the likelihood that chlorine residues will appear in the finished composition. The latter has potential environmental problems.

SUMMARY OF INVENTION

We have unexpectedly found that certain chlorine-free compounds such as ammonium acetate can be usefully employed in the reaction of the above process and with the result that a finished composition with greatly reduced chlorine levels can be produced.

The invention therefore provides a process for the preparation of a lubricating oil additive concentrate having a TBN greater than 300 which process comprises reacting at elevated temperature component (A) at least one compound which is A(i) an alkaline earth metal hydrocarbyl-substituted phenate, A(ii) a hydrocarbyl-substituted phenol, A(iii) an alkaline earth metal hydrocarbyl-substituted phenate and a source of sulphur, A(iv) a hydrocarbyl-substituted phenol and a source of sulphur, A(v) an alkaline earth metal sulphurised hydrocarbyl-substituted phenate or A(vi) a sulphurised hydrocarbyl-substituted phenol, component (B) an alkaline earth metal base added either in a single addition or in a plurality of additions at intermediate points during the reaction, component (C) at least one compound which is C(i) a polyhydric alcohol having 2 to 4 carbon atoms, C(ii) a di- ($C_2$-$C_4$) glycol, C(iii) a tri ($C_2$-$C_4$) glycol, C(iv) a mono- or poly-alkylene glycol alkyl ether of the formula (II)

wherein $R^3$ is a $C_1$ to $C_6$ alkyl group, $R^4$ is an alkylene group, $R^5$ is hydrogen or a $C_1$ to $C_6$ alkyl group and x is an integer from 1 to 6, C(v) a $C_1$ to $C_{20}$ monohydric alcohol, C(vi) a $C_1$ to $C_{20}$ ketone, C(vii) a $C_1$ to $C_{10}$ carboxylic acid ester, or C(viii) a $C_1$ to $C_{20}$ ether, component (D) a lubricating oil, component (E) carbon dioxide added subsequent to the, or each, addition of component (B), component (F) sufficient to provide from 2 to 40% by weight based on the weight of the concentrate, of at least one compound which is F(i) a carboxylic acid or an acid anhydride, ester or salt thereof, said acid having the formula (I)

$$R^1-\underset{R^2}{CH}-COOH \qquad (I)$$

wherein $R^1$ is a $C_{10}$ to $C_{24}$ alkyl or alkenyl group and $R^2$ is hydrogen, a $C_1$ to $C_4$ alkyl group or a $CH_2COOH$ group, or F(ii) a poly-carboxylic acid containing from 36 to 100 carbon atoms or an acid anhydride, ester or salt thereof, and component (G) an ammonium alkanoate or a mono-, di-, tri- or tetra-alkyl ammonium formate or alkanoate, the weight ratios of components (A) to (G) being such as to produce a concentrate having a TBN greater than 300.

The process affords a method of producing concentrate additives having a high TBN and comprising alkaline earth metal hydrocarbyl-substituted phenates starting from hydrocarbyl substituted phenols with or without sulphur.

The process also affords a method for up-grading low TBN products of the prior art or off-specification products into high TBN products having an acceptable viscosity. In this particular case, because hydrogen sulphide is not evolved during operation of the process of the invention, in contrast to processes for producing sulphurised alkaline earth metal alkyl phenates involving the reaction of an alkyl phenol and a source of sulphur, the hydrogen sulphide disposal problem is avoided, thereby allowing manufacture in environmentally sensitive locations and the use of less sophisticated plant.

DETAILED DESCRIPTION OF INVENTION

Suitably the amount of ingredient (G) employed in the reaction is up to 2.0% by weight based on the total weight of the concentrate.

Component (A) of the reaction mixture is (i) an alkaline earth metal hydrocarbyl-substituted phenate, (ii) a hydrocarbyl-substituted phenol, (iii) an alkaline earth metal hydrocarbyl-substituted phenate and a source of sulphur (iv) a hydrocarbyl-substituted phenol and a source of sulphur, (v) an alkaline earth metal sulphurissd hydrocarbyl-substituted phenate or (vi) a sulphurised hydrocarbyl-substituted phenol, or mixtures of at least two of A(i)–A(vi).

Using component (A) (i) or A(ii) the final additive concentrate comprises an alkaline earth metal hydrocarbyl-substituted phenate and using component A(iii), A(iv), A(v) or A(vi) the final additive concentrate comprises a sulphurised alkaline earth metal hydrocarbyl-substituted phenate. Suitably the alkaline earth metal may be strontium, calcium, magnesium or barium, preferably calcium, barium or magnesium, more preferably calcium.

Although it is possible to use as a feedstock (A) (ii) a hydrocarbyl-substituted phenol, (A) (iv) a hydrocarbyl-substituted phenol and a source of sulphur, or A (vi) a sulphurised hydrocarbyl-substituted phenol, it is preferred to use either (A)(i), (A)(iii) or A(v) i.e. to upgrade a pre-formed alkaline earth metal hydrocarbyl-substituted phenate or sulphurised phenate. The phenate or sulphurised phenate may be carbonated or non-carbonated.

The hydrocarbyl substituent of the hydrocarbyl-substituted phenol or the alkaline earth metal hydrocarbyl phenate is preferably an alkyl group. The alkyl group may be branched or unbranched. Suitable alkyl groups contain from 4 to 50, preferably from 9 to 28, carbon atoms. A particularly suitable alkyl phenol is the $C_{12}$-alkyl phenol obtained by alkylating phenol with propylene tetramer. The hydrocarbyl-substituted phenate and the hydrocarbyl substituted phenol may be a mono or poly substituted compound. A particularly suitable poly-substituted phenol is dinonyl phenol. Where component (A) contains a source of sulphur or a sulphurised phenate, the amount of sulphur incorporated in the additive concentrate is preferably 1 to 6%, more preferably 1.5 to 3% by weight based on the weight of the concentrate. The source of sulphur may for example be elemental sulphur, a sulphur monohalide or sulphur dihalide.

Methods for preparing alkaline earth metal hydrocarbyl phenates are well known in the art.

The alkaline earth metal base [component B] may suitably be an alkaline earth metal oxide or hydroxide, preferably the hydroxide. Preferred alkaline earth metals are calcium, magnesium and barium and more preferred is calcium. The alkaline earth metal base must be added in an amount relative to component (A) sufficient to produce a product having a TBN in excess of 300, preferably in excess of 350, more preferably in excess of 370, most preferably in excess of 400. This amount will depend on a number of factors including the nature of the phenol or phenate, the amount of lubricating oil added and will be higher than the amounts generally employed in prior art processes. Typically, the weight ratio of component (B) to component (A) is 0.2 to 50:1, preferably 0.4 to 10:1. The alkaline earth metal base (B) may be added to the initial reactants all at once, or part may be added to the initial reactants and the remainder in one or more portions at a subsequent stage or stages in the process.

Component (C) can be a polyhydric alcohol having from 2 to 4 carbon atoms. The polyhydric alcohol is suitably a dihydric alcohol, for example ethylene glycol or propylene glycol, or a trihydric alcohol, for example glycerol. The di- or tri- ($C_2$ to $C_4$) glycol may suitably be either diethylene glycol or triethylene glycol. The alkylene glycol alkyl ether or polyoxyalkylene glycol alkyl ether may suitably be of the formula:

$$R^3(OR^4)_xOR^5 \qquad (II)$$

wherein $R^3$ is $C_1$ to $C_6$ alkyl, $R^4$ is an alkylene group, $R^5$ is hydrogen or $C_1$ to $C_6$ alkyl and x is an integer of 1 to 6. Suitable compounds having the formula (II) include the monomsthyl or dimethyl ethers of ethylene glycol, diethylene glycol, triethylene glycol or tetraethylene glycol. A particularly suitable diglycol ether is methyl digol ($CH_3OCH_2CH_2OCH_2CH_2OH$). Mixtures of glycols and glycol ethers of formula (II) may also be employed. Component (C), may also suitably be a $C_1$ to $C_{20}$ monohydric alcohol, a $C_1$ to $C_{20}$ ketone, a $C_1$ to $C_{10}$ carboxylic acid ester or a $C_1$ to $C_{20}$ ether which may be aliphatic, alicyclic or aromatic. Examples are methanol, acetone, 2-ethyl haxanol, cyclohexanol, cyclohexanone, benzyl alcohol, ethyl acetate and acetophenone, preferably 2-ethyl hexanol. In the preferred method of producing the concentrate of the present invention, there may be used in combination (i) component (C) as defined above and (ii) a solvent.

As the solvent (ii) there may suitably be used an inert hydrocarbon, which may be aliphatic or aromatic. Examples of suitable solvents (ii) include toluene, xylene, naphtha and aliphatic paraffins, for example hexane, and cycloaliphatic paraffins.

A suitable combination of (i) and (ii) is methanol and toluene. An advantage of using a combination of (i) and (ii) is that the use of ethylene glycol can be avoided. Residual ethylene glycol in the lubricating oil additive may result in corrosion of an engine in which the concentrate is used.

The lubricating oil [component (D)] is suitably an animal oil, a vegetable oil or a mineral oil. Suitably the lubricating oil is a petroleum-derived lubricating oil, such as a naphthenic base, paraffin base or mixed base oil. Solvent neutral oils are particularly suitable. Alternatively, the lubricating oil may be a synthetic lubricating oil. Suitable synthetic lubricating oils include synthetic ester lubricating oils, which oils include diesters such as di-octyl adipate, di-octyl sebacate and tridecyladipate, or polymeric hydrocarbon lubricating oils, for example liquid polyisobutenes and poly-alpha olefins. When ingredient (D) is a vegetable oil, the lubricating oil used in the finished lubricating oil composition into which the concentrate is incorporated is suitably also a vegetable oil. The lubricating oil may suitably comprise 10 to 90%, preferably 10 to 70%, by weight of the composition.

Component (E) is carbon dioxide, which may be added in the form of a gas or a solid, preferably in the form of a gas. When used in gaseous form, it may suitably be blown through the reaction mixture. The amount of carbon dioxide used is preferably 5 to 20%, especially 9 to 15%, by weight based on the weight of the concentrate.

Where the process of the present invention is an upgrade process (ie component (A) contains A(i), A(iii) or A(v)), it is preferred that component (B) is added in two stages, each addition being followed by an addition of carbon dioxide. However where component (A) comprises a phenol ie comprises A(ii), A(iv) or A(vi), then it is preferred that component (B) is added in a single addition and the carbon dioxide is also added in a single addition subsequent to the addition of component (B).

Component (F) is F(i) a carboxylic acid of formula (I) as defined above or an ester, acid anhydride or a salt thereof, or F(ii) a poly-carboxylic acid containing from 36 to 100 carbon atoms, or an ester, acid anhydride or a salt thereof. The amount of the aforesaid added should be sufficient to provide 2 to 40% by weight based on the weight of the concentrate. The alkaline earth metal hydrocarbyl phenate is, in this way, thus modified. Preferably $R^1$ in the carboxylic acid of formula (1) is unbranched alkyl or alkenyl. Preferred acids of formula (I) are those wherein $R^1$ is a $C_{10}$ to $C_{24}$, more preferably $C_{18}$ to $C_{24}$, straight chain alkyl, and $R^2$ is hydrogen. Examples of suitable saturated carboxylic acids of formula (I) include capric acid, lauric acid, myristic acid, palmitic acid, stearic acid, isostearic acid, arachidic acid, behenic acid and lignoceric acid. Examples of suitable unsaturated acids of formula (I) include lauroleic acid, myristoleic acid, palmitoleic acid, oleic acid, gadoleic acid, erucic acid, ricinoleic acid, linoleic acid and linolenic acid. Mixtures of acids may also be employed, for example rape top fatty acids. Particularly suitable mixtures of acids are those commercial grades containing a range of acids, including both saturated and unsaturated acids. Such mixtures may be obtained synthetically or may be derived from natural products, for example cotton oil, ground nut oil, coconut oil, linseed oil, palm kernel oil, olive oil, corn oil, palm oil, castor oil, soyabean oil, sunflower oil, herring oil, sardine oil and tallow. Sulphurised acids and acid mixtures may also be employed. Instead of, or in addition to, the carboxylic acid there may be used an ester of acid anhydride, of the acid, preferably the acid anhydride. Where a salt of the carboxylic acid is used, it is preferred that the salt is an alkaline earth metal salt. It is preferred however to use a carboxylic acid or a mixture of carboxylic acids. A preferred carboxylic acid of formula (1) is stearic acid.

Instead of, or in addition to, using (F)(i), F(ii), which is a poly-carboxylic acid containing from 36 to 100 carbon atoms or an ester or acid anhydride thereof can be used. F(ii) is preferably a di-carboxylic acid. Examples are polyisobutene succinic acid or a polyisobutene succinic anhydride.

Preferably the carboxylic acid(s) having the formula (I), or the poly-carboxylic acid or an ester, acid anhydride or salt thereof is incorporated in an amount of 10% to 40%, more preferably 12 to 20%, for example about 16%, by weight based on the weight of the additive concentrate. An advantage of incorporating greater than 10% of the carboxylic acid or derivative thereof is generally a relatively lower concentrate viscosity is produced.

Suitably the alkaline earth metal may be present in the additive concentrate in an amount of 10 to 20% by weight based on the weight of the concentrate.

Component (G) is an ammonium alkanoate or a mono-, di-, tri- or tetra-alkyl ammonium formate or alkanoate.

The alkanoate is suitably a $C_2$ to $C_{10}$ alkanoate, preferably a $C_2$ to $C_4$ alkanoate, for example an acetate or propionate; the use of ammonium acetate is especially preferred. When a substituted ammonium compound is used, it is preferably a tetra-($C_1$ to $C_4$ alkyl) ammonium compound, especially a tetramethylammonium compound such as tetramethylammonium acetate.

Preferably the TBN of the concentrate is greater than 350, more preferably greater than 370 even more preferably greater than 400. Suitably the composition has a viscosity measured at 100° C. of less than 1000 cSt, preferably less than 750 cSt, more preferably less than 500 cSt.

Suitably the reaction of components (A)–(G) may be carried out at 50° to 200° C., preferably 130° to 165° C., the pressure may be atmospheric, subatmospheric or superatmospheric.

The concentrate may be recovered by conventional means, for example by distillative stripping of component (C).

Finally, it is preferred to filter the concentrate so obtained.

Generally, the process of the invention will produce a concentrate having an acceptable viscosity, that is a viscosity of less than 1000 cSt at 100° C., and can produce concentrates having a viscosity less than 750 or 500 cSt at 100° C. Moreover, the concentrates generally have desirable viscosity index properties. Such viscometric properties are advantageous because they facilitate processing (including filtration) of the concentrate.

However, it is also possible to produce concentrates having a higher viscosity than 1000 cSt at 100° C., generally at higher TBN levels. Filtration of such concentrates presents a problem, which may be overcome by adding a diluent prior to filtration and stripping the diluent off after filtration. Alternatively, high viscosity concentrates, for example concentrates having a viscosity at 100° C. greater than 1000 cSt, and also having a high TBN, for example greater than 350, may be diluted by addition of further lubricating oil whilst maintaining a TBN greater than 300, thereby facilitating filtration.

According to a further aspect of the present invention, there is provided a finished lubricating oil composition which composition comprises a lubricating oil and an additive concentrate prepared as hereinbefore described.

In another aspect of the present invention there is provided an additive concentrate composition comprising an additive concentrate prepared as hereinbefore described and optionally effective amounts of one or more types of conventional lubricating oil additives.

The additive concentrate composition will necessarily comprise less lubricating oil than a finished lubricating oil composition as described above.

Preferably the finished lubricating oil composition contains sufficient of the additive concentrate to provide a TBN in the range from 0.5 to 150.

The amount of additive concentrate present in the finished lubricating oil will depend on the nature of the final use. Thus, for marine lubricating oils the amount of additive concentrate present may suitably be sufficient to provide a TBN of 9 to 100 and for automobile engine lubricating oils the amount may suitably be sufficient to provide a TBN of 4 to 20.

The finished lubricating oil may also contain effective amounts of one or more other types of conventional lubricating oil additives, for example viscosity index improvers, anti-wear agents, antioxidants, dispersants, rust inhibitors, pour-point depressants, or the like, which may be incorporated into the finished lubricating oil composition either directly or through the intermediacy of the concentrate composition.

The invention will now be further illustrated by reference to the following Examples.

The term "TBN" is used to denote the Total Base Number in mg KOH/g as measured by the method of ASTM D2896. The viscosity was measured by the method of ASTM D445. In Example 1, ADX 402 the commercially available sulphurised calcium alkyl phenate is derived from ADX 100, a commercially available $C_{12}$-alkyl phenol obtained by alkylating phenol with propylene tetramer, which is the phenol used in Example 2. ADX 100 and ADX 402 are both available from Adibis.

EXAMPLE 1

Charge: Commercially Available Sulphurised Calcium

| alkyl phenate (250 TBN) ADX402 | 230 g |
|---|---|
| Lubricating oil | 26 g |
| Ammonium acetate | 3 g |
| Lime | 66 g |
| Stearic acid | 63 g |

Method

The above charge was heated to 90° C./700 mmHg, and the mixture was stirred for 1 hour. The temperature was then increased to 115° C. at which temperature 2-ethylhexanol (151 g) was added. The temperature was then increased to 145° C./700 mmHg and ethylene glycol (32 g) was added quickly (over 1 minute). The mixture was held for 5 minutes at 145° C./700 mmHg. Carbon dioxide (66 g) was then added at 145° C./1 bar. The solvent was recovered at 210° C./10 mmHg to give a solvent distillate (186 g). The stripped product (384 g) was then filtered. The product composition after filtration was:

| Calcium | 15.0% w/w |
|---|---|
| Sulphur | 2.0% w/w |
| $CO_2$ | 10.5% w/w |
| TBN | 431 mg KOH/g |
| Viscosity @ 100° C. | 711 cSt |

EXAMPLE 2

Charge: Commercially available alkylphenol

| ADX 100 | 64 g |
|---|---|
| Lubricating Oil | 111 g |
| Sulphur | 23 g |
| Stearic Acid | 59 g |
| 2-ethyl hexanol | 130 g |

The above charge was heated to 120° C./700 mm Hg and lime (50 g) was added. Ammonium acetate (3 g) dissolved in 2-ethylhexanol (57 g) was slowly added to the reaction mixture which was then heated to 145° C./700 mm Hg. Ethylene glycol (31 g) was then added to the reaction mixture which was simultaneously heated to 165° C./1 bar. Carbon dioxide (34 g) was added and the reaction mixture cooled to 125° C. A further quantity of lime (30 g) was added and the temperature raised again to 165° C./700 mm Hg and held for 10 minutes. Carbon dioxide (17 g) was added at 165° C./1 bar and the reaction mixture then heated to 200° C. whilst applying a vacuum to 10 mm Hg to facilitate removal of the solvent. The stripped product (340 g) was then filtered. The product composition after filtration was:

| Calcium | 13.5% w/w |
|---|---|
| Sulphur | 3.1% w/w |
| TBN | 381 mg KOHg$^{-1}$ |
| Viscosity @ 100° C. | 204 cSt |

We claim:

1. A process for the preparation of a lubricating oil additive concentrate having a TBN greater than 300 which process comprises reacting at elevated temperature component (A) at least one compound which is A(i) an alkaline earth metal hydrocarbyl-substituted phenate, A(ii) a hydrocarbyl-substituted phenol, A(iii) an alkaline earth metal hydrocarbyl-substituted phenate and a source of sulphur, A(iv) a hydrocarbyl-substituted phenol and a source of sulphur, A(v) an alkaline earth metal sulphurised hydrocarbyl-substituted phenate or A(vi) a sulphurissd hydrocarbyl-substituted phenol, component (B) an alkaline earth metal base added either in a single addition or in a plurality of additions during the reaction, component (C) at least one compound which is C(i) a polyhydric alcohol having 2 to 4 carbon atoms, C(ii) a di- (C$_2$-C$_4$) glycol, C(iii) a tri (C2-C4) glycol, C(iv) a mono- or poly-alkylene glycol alkyl ethsr of the formula (II)

$$R^3(OR^4)_xOR^5 \qquad (II)$$

wherein R$^3$ is a C$_1$ to C$_6$ alkyl group, R$^4$ is an alkylene group, R$^5$ is hydrogen or a C$_1$ to C$_6$ alkyl group and x is an integer from 1 to 6, C(v) a C$_1$ to C$_{20}$ monohydric alcohol, C(vi) a C$_1$ to C$_{20}$ ketone, C(vii) a C$_1$ to C$_{10}$ carboxylic acid ester, or C(viii) a C$_1$ to C$_{20}$ ether, component (D) a lubricating oil, component (E) carbon dioxide added subsequent to the, or each, addition of component (B), component (F) sufficient to provide from 2 to 40% by weight based on the weight of the concentrate, of at least one compound which is F(i) a carboxylic acid or an acid anhydride, ester or salt thereof, said acid having the formula (I)

$$R^1-\underset{\underset{R^2}{|}}{CH}-COOH \qquad (I)$$

wherein R$^1$ is a C$_{10}$ to C$_{24}$ alkyl or alkenyl group and R$^2$ is hydrogen, a C$_1$ to C$_4$ alkyl group or a CH$_2$COOH group, or F(ii) a poly-carboxylic acid containing from 36 to 100 carbon atoms or an acid anhydride, ester or salt thereof, and component (G) an ammonium alkanoate or a mono-, di-, tri- or tetra-alkyl ammonium formate or alkanoate, the weight ratios of components (A) to (G) such as to produce a concentrate having a TBN greater than 300.

2. A process as claimed in claim 1 wherein component (A) is at least one of A(i), A(iii) or A(v).

3. A process as claimed in either claim 1 or claim 2 wherein component (B) is calcium oxide or hydroxide.

4. A process as claimed in claim 1 wherein component (C) is ethylene glycol or 2-ethylhexanol.

5. A process as claimed in claim 1 wherein component (F) is stearic acid or a salt thereof.

6. A process as claimed in claim 1 wherein component (G) is an ammonium alkanoate or a tetra-alkyl ammonium alkanoate.

7. A process as claimed in claim 6 where said alkanoate is a C$_2$-C$_4$ alkanoate.

8. A process as claimed in claim 6 wherein component (G) is ammonium acetate.

9. A process as claimed in claim 1 wherein said lubricating oil additive concentrate has a viscosity at 100° C. of less than 1000 cSt.

* * * * *

UNITED STATES PATENT AND TRADEMARK OFFICE
CERTIFICATE OF CORRECTION

PATENT NO. : 5,162,085
DATED : November 10, 1992
INVENTOR(S) : CHARLES CANE, DAVID A. DUNCAN and
SEAN P. O'CONNOR It is certified that error appears in the above-indentified patent and that said Letters Patent is hereby corrected as shown below:

Col. 1, The title should read "A Process for the Production of a Lubricating Oil Additive Concentrate"

Col. 3, l. 14, correct the spelling of "alkenyl"

Col. 3, l. 51, correct the spelling of the word "sulphuris_e_d"

Col. 3, l. 68, correct the spelling of the word "su_b_stituted"

Col. 4, l. 58, correct the spelling of the word "monom_e_thyl"

Col. 4, l. 67, after "2-ethyl" correct the spelling of the word "h_e_xanol,"

Col. 8, lines 64-65:
Claim 1, line 13, correct the spelling of the word "sulphyris_e_d"

Claim 1, col. 9, l. 5, correct the spelling of the word "eth_e_r"

Signed and Sealed this

First Day of November, 1994

Attest:

BRUCE LEHMAN

Attesting Officer

Commissioner of Patents and Trademarks